(12) United States Patent
Carpenter et al.

(10) Patent No.: US 6,433,936 B1
(45) Date of Patent: Aug. 13, 2002

(54) LENS OF GRADIENT DIELECTRIC CONSTANT AND METHODS OF PRODUCTION

(75) Inventors: Michael P. Carpenter, Acton; Mary M. Osward, Holbrook; David A. Gibbs, Waban, all of MA (US)

(73) Assignee: Emerson & Cuming Microwave Products, Randolph, MA (US)

( * ) Notice: Subject to any disclaimer, the term of this patent is extended or adjusted under 35 U.S.C. 154(b) by 0 days.

(21) Appl. No.: 09/930,576

(22) Filed: Aug. 15, 2001

(51) Int. Cl.⁷ .................. G02B 3/00; B29D 11/00; H01Q 15/08
(52) U.S. Cl. ............... 359/652; 264/1.7; 264/1.8; 264/2.2; 264/2.7; 343/911 R; 343/911 L
(58) Field of Search ................. 359/652, 653, 359/654; 343/911 R, 911 L; 264/1.7, 1.8, 2.2, 2.7

(56) References Cited

U.S. PATENT DOCUMENTS

| | | | |
|---|---|---|---|
| 3,133,285 A | * | 5/1964 | Jordan et al. ........... 343/911 R |
| 3,470,561 A | | 9/1969 | Horst |
| 3,656,165 A | | 4/1972 | Walter et al. |
| 3,680,123 A | | 7/1972 | Bryant et al. |
| 3,703,723 A | | 11/1972 | Albanese et al. |
| 3,765,021 A | | 10/1973 | Chiron et al. |
| 3,781,900 A | | 12/1973 | Fuller et al. |
| 3,914,769 A | | 10/1975 | Andrews |
| 3,972,043 A | | 7/1976 | Locus |
| 4,287,519 A | | 9/1981 | Doi |
| 4,309,710 A | | 1/1982 | Cassel |
| 4,361,841 A | | 11/1982 | Cassel et al. |
| 4,531,129 A | | 7/1985 | Bonebright et al. |
| 4,973,965 A | | 11/1990 | Rodge et al. |
| 5,142,290 A | | 8/1992 | DuFont |
| 5,243,186 A | | 9/1993 | Hilliard et al. |
| 5,424,737 A | | 6/1995 | Lindell |
| 5,607,492 A | | 3/1997 | Doric |
| 5,677,796 A | | 10/1997 | Zimmerman et al. |
| 5,781,163 A | | 7/1998 | Ricardi et al. |
| 6,043,769 A | | 3/2000 | Rowe et al. |
| 6,229,500 B1 | * | 5/2001 | Caille et al. ................. 343/909 |

* cited by examiner

Primary Examiner—Scott J. Sugarman
(74) Attorney, Agent, or Firm—Kevin M. Farrell

(57) ABSTRACT

Disclosed is a lens of gradient dielectric constant and methods for the production of same. The lens includes an inner core comprising a cured or fused substantially homogenous blend of glass spheres, curable or fusible binder and, as needed to increase dielectric constant, a low-loss dielectric material. The inner core preferably has a dielectric constant of about 2.0, and an interstitial void volume (representing trapped air space between elements of the cured or fused material) of from about 30% to about 50%. The lens also includes an outer shell layer comprising a cured or fused substantially homogeneous blend of hollow glass spheres and curable or fusible resin. The outer shell layer preferably has a dielectric constant of about 1.0, and an interstitial void volume of from about 30% to about 50%. In addition, the lens includes a minimum of one, and preferably two or more intermediate layers, the intermediate layers having a dielectric constant falling between 1 and 2. The intermediate layers are comprised of a cured substantially homogenous blend of glass spheres, resin and, as needed to increase dielectric constant, a low-loss dielectric material. As is the case with the inner core and outer shell layers, the intermediate layer(s) have an interstitial void volume of from about 30% to about 50%. Also disclosed are methods of production for lenses of the type described above.

41 Claims, No Drawings

LENS OF GRADIENT DIELECTRIC CONSTANT AND METHODS OF PRODUCTION

BACKGROUND OF THE INVENTION

A lens is a device which alters the direction of travel of an electromagnetic wave as the wave passes through the lens. This change in direction is a consequence of a change in dielectric constant and hence refractive index encountered by the wave as it passes from an adjacent medium into and through the lens. Lenses for use at optical frequencies include those used in corrective eyeglasses, cameras, binoculars and the like. Lenses also find application in connection with high frequency electromagnetic waves, such as microwave frequencies.

An important subclass of lens is the gradient lens. An electromagnetic wave passing through a gradient lens encounters a varying dielectric constant. A Luneberg lens is a spherical gradient lens having a defined dielectric constant gradient and finds particular application in providing antennas with very wide fields of view. In particular, current interest in them is driven by the telecommunication projects based on low earth orbit (LEO) satellites, which travel much closer to the earth than geostationary (GEO) satellites and are, therefore, more suited for high data transmission rates and Internet access. However, the movement of LEO satellites across the sky makes them difficult to track and a standard dish antenna would need to move to stay in contact with the satellite. A stationary Luneberg antenna can "see" the satellite across the entire horizon. An ideal Luneberg lens has a dielectric constant at its outer surface of approximately 1.0 and a dielectric constant of about 2.0 at its central core. For cases in which the focal point is located away from the surface of the spherical lens modifications well known to those skilled in the art are required.

The physical fabrication of the Luneberg lens has proven to be a significant challenge, and numerous methods of fabrication have been developed. According to Luneberg's teaching, the refractive index should vary continuously as a function of the lens' radial coordinates However, no practical techniques have been suggested for fabricating a lens having a continuously varying dielectric constant. Accordingly, it is current practice to fabricate a lens by assembling layers of lens components of different dielectric constants to effect a step-wise approximation of the theoretical refractive index gradient. Among the deficiencies associated with current methods of production include the presence of air gaps between layers which exacerbates gradient discontinuities and wave scatter within the lens. Layers fabricated by gaseous expansion of a polymeric matrix exhibit non-homogeneous regions with varying dielectric constant thereby degrading lens performance. Further, the expanding agent, normally a volatile hydrocarbon, presents flammability and toxic emission problems during manufacture of the lens. Foams fabricated from air encapsulated in glass microspheres fixed in a solid resin matrix (commonly referred to as syntactic foams) do not provide material with a dielectric constant less than about 1.4, deviating significantly from the desired dielectric constant of 1.0 at the lens outer surface, and therefore degrading lens performance. Further, such lenses are heavy and tend to be characterized by relatively high dielectric loss. Alternative methods, while producing satisfactory results, have proven to be extraordinarily expensive. A method for producing a Luneberg lens which overcomes problems or drawbacks associated with current methods of production would represent a significant advance in the art.

SUMMARY OF THE INVENTION

The present invention relates to a lens of gradient dielectric constant and methods for the production of same. The lens includes an inner core comprising a cured or fused substantially homogenous blend of glass spheres, curable or fusible binder and, as needed to increase dielectric constant, a low-loss dielectric material. The inner core preferably has a dielectric constant of about 2.0, and an interstitial void volume (representing trapped air space between elements of the cured or fused material) of from about 30% to about 50%.

The lens also includes an outer shell layer comprising a cured or fused substantially homogenous blend of hollow glass spheres and curable or fusible resin. The outer shell layer preferably has a dielectric constant of about 1.0, and an interstitial void volume of from about 30% to about 50%. In addition, the lens includes a minimum of one, and preferably two or more intermediate layers, the intermediate layers having a dielectric constant falling between 1 and 2. The intermediate layers are comprised of a cured substantially homogenous blend of glass spheres, resin and, as needed to increase dielectric constant, a low-loss dielectric material. As is the case with the inner core and outer shell layers, the intermediate layer(s) have an interstitial void volume of from about 30% to about 50%.

DETAILED DESCRIPTION OF THE INVENTION

In one aspect, the present invention relates to a method for manufacturing a lens of gradient dielectric constant. The method for manufacture employs a mold set adapted for vibration while filling. The mold set is produced using conventional techniques and materials and includes an inner core mold which is essentially a hollow sphere. Typically the inner core mold is assembled from two hemispherical shells. When assembled, a filler hole remains to enable a curable or fusible material to be poured into the mold. Similar hemispherical shell pairs of increasing size are provided for casting one or more intermediate layers, and an outer shell layer. The selection of an appropriate diameter is influenced by the radiation pattern of the source microwave, the desired directivity of the lens, the specified location of the focal point with respect to the lens surface, and the number of layers selected. The number of layers is a balance of lens performance against ease of manufacture. One skilled in the art of Luneberg lens design may theoretically determine the number of layers, diameter of each layer of the lens, and dielectric constant of each layer to achieve a given lens performance.

In the method of the present invention, glass spheres, binder and, as needed, a low-loss dielectric material are combined in a substantially homogenous dry blend before fusing or curing to form a solid molded material. Before discussing theoretical calculations and assumptions used to arrive at a blend which, when cured or fused, will yield a composition having the desired dielectric constant, it is useful first to discuss some of the properties of the various ingredients and how they interact in the production process.

The glass spheres used in connection with the present invention typically range in size from about 15 micron particle size up to about 200 micron particle size with a mean particle size of 40–60 microns. They are available as solid glass, or hollow glass spheres having predetermined wall thickness. Such spheres are available from a variety of manufacturers including 3M Company and Emerson & Cuming Composite Materials, Inc. The selection of thinwalled, thicker-walled or solid glass spheres affects the physical properties of the lens as discussed in detail below. One skilled in the art familiar with the present disclosure will be enabled to choose spheres from among the options available, and optionally blend sphere varieties, to achieve desired lens performance.

Curable binders useful in connection with the present invention include polyester, epoxy, polyurethane and acrylic resins. Fusible binders useful in connection with the present invention include polyester, polyolefin, polyamide, polystyrene and styrene copolymers and thermoplastic elastomers. The specific binders listed are merely examples —one skilled in the art will recognize that alternative curable or fusible binder materials may be substituted. The size of the molecular elements which comprise the binder material is comparable to or smaller than, the particle size of the glass spheres. The purpose of the binder is to adhere the glass spheres to each other at their points of contact without filling the interstitial voids between the glass spheres to create a dimensionally stable, porous structure. When this is carried out in accordance with the teaching of the subject disclosure, interstitial void volumes of from about 30% to about 50% are formed. The inclusion of trapped interstitial void volumes is believed to be a novel aspect of the present method. A further novel aspect is the dimensional stability of the porous structure, which does not exhibit shrinkage during curing or fusing of the binder, thereby allowing the molding of concentric shells upon each other without cracking or other internal structural damage. The presence of the trapped air aids in reducing the dielectric constant of the formed material. Surprisingly, the nature (i.e., volume and distribution) of the interstitial void volumes has proven to be remarkably consistent and reproducible.

Another specified component, useful particularly in layers of the Luneberg lens which require a high dielectric constant (relative to outer shell layers), is a low-loss dielectric material. In preferred embodiments, the low-loss dielectric material has a loss tangent (tan delta) below about 0.01, measured at microwave frequencies. Preferred low-loss dielectric materials include titanium dioxide, boron nitride, silicon dioxide, aluminosilicates, magnesium oxide and aluminum oxide. From this preferred group, titanium dioxide is a particularly well-suited material. The low-loss dielectric material is included in higher dielectric constant layers to increase the density (and therefore the dielectric constant) of the layer. The inclusion of this material has a negligible effect on the volume and distribution of interstitial void volumes.

For purposes of approximating the relationship between dielectric constant and density of the fused or cured material, the following algorithm has been found to apply:

$$\ln k' = (\text{constant})(\text{actual layer density})$$

In this algorithm the natural log (ln) of the dielectric constant (k') is equal to the product of a constant and the actual layer density of the fused or cured material produced. The value of this constant is dependent upon the ingredients that compose the fused or cured material. For example, with the combination of 3M Company Kl Scotchlite Glass Bubbles, duPont Powder Coatings Crystal Clear Resin, and titanium dioxide the value of the constant is about 1.28 g/cc. Changing to K46 Scotchlite Glass Bubbles from Kl Glass Bubbles in this composition results in a constant of about 1.18 g/cc. The value of the constant is determined by statistical regression of measured actual layer density and dielectric constant values of test samples.

The actual fused or cured layer density equals the true particle density (TPD) multiplied by a "packing factor" which accounts for the presence of trapped air in the interstitial spaces. The packing factor equals one minus the interstitial void volume. When fabrication is carried out in accordance with the teachings of the subject disclosure, the packing factor will range from about 0.7 to about 0.5. The packing factor is influenced by the ingredients which compose the layer material and the conditions under which the mold is vibrated, and averages about 0.65.

It is instructive to consider an example showing the calculation of TPD, introduction of the "packing factor" and the solution of algorithm set forth above for k'. Consider an example in which the following ingredients are mixed in the specified proportions (by volume).

83.7% glass spheres (density 0.46 g/cm3)
14.8% resin (density 1.3 g/cm3)
1.5% titanium dioxide (density 4.3 g/cm3)

TPD is calculated as the sum of the fractional densities as follows:

$$(0.837)(0.46 \text{ g/cm3}) + (0.148)(1.3 \text{ g/cm3}) + (0.015)(4.3) = 0.642 \text{ g/cm3}$$

TPD is then adjusted by multiplying it by the "packing factor".

$$(0.642 \text{ g/cm3})(0.65) = 0.417 \text{ g/cm3}$$

The product, 0.417 g/cm3, represents a very close approximation to the actual material density which can be confirmed experimentally. This value can then be used to solve the algorithm shown above which includes the k' variable.

$$\ln k' = (1.18)(0.417)$$

$$\ln k' = 0.492$$

$$k' = 1.64$$

An initial step in the method of the present invention is the production of the central core. As discussed in the Background of the Invention section, the center of a spherical Luneberg lens has a dielectric constant of about 2.0. For production of the inner core of the lens, it may be necessary to include a low-loss dielectric material such as titanium dioxide in order to increase density to a sufficient level to achieve the necessary dielectric constant.

The volume ratio of binder to glass spheres ranges from about 5–10% at the lower end of the useful range to about 30% at the upper end of the useful range. If too little binder is used, the composition has a tendency to crumble. If too much binder is used, the trapped interstitial space decreases during fusing or curing of the material, thereby causing the material to shrink. This shrinkage results in poor molding of concentric layers upon each other and can generate internal stresses that may cause cracking of layers and poor lens performance.

One way in which a blender of materials can accurately select quantities of ingredients to be blended is to produce a layer of the Luneberg lens having a predetermined dielectric constant making use of the previously noted relationship between dielectric constant and actual layer density. Consider, for example, the production of an intermediate layer having dielectric constant of 1.2. By the relationship between dielectric constant and actual layer density, utilizing Kl Scotchlite Glass Bubbles, Crystal Clear resin and titanium dioxide:

$$\ln k' = 1.28 \text{ (actual layer density)}$$

$$\begin{aligned}\text{actual layer density} &= \ln k'/1.28 \\ &= \ln(1.2)/1.28 \\ &= 0.18/1.28 \\ &= 0.14 \text{ g/cc}\end{aligned}$$

Taking the packing factor as 0.65:

$$\begin{aligned}TPD &= \text{actual layer density/packing factor} \\ &= 0.14/0.65 \\ &= 0.22 \text{ g/cc}\end{aligned}$$

While various combinations of glass spheres, resin, and titanium dioxide can satisfy a TPD of 0.22 g/cc, empirical studies have shown that to achieve dielectric constants desired for the outer layers of a Luneberg lens, it is not necessary to include a low-loss dielectric material such as titanium dioxide. Therefore, for the example selected, the desired TPD may be achieved with a mixture of 52 g glass spheres (density 0.125 g/cc), and 48 g resin (density 1.3 g/cc):

$$TPD = \text{sum of component weight/sum of component volume}$$

$$\begin{aligned}\text{sum of component weight} &= 52 \text{ g} + 48 \text{ g} \\ &= 100 \text{ g}\end{aligned}$$

$$\begin{aligned}\text{sum of component volume} &= 52 \text{ g}/0.125 \text{ g/cc} + 48/1.3 \text{ g/cc} \\ &= 416 \text{ cc} + 36.9 \text{ cc} \\ &= 452.9 \text{ cc}\end{aligned}$$

$$\begin{aligned}TPD &= 100 \text{ g}/452.9 \text{ cc} \\ &= 0.22 \text{ g/cc}\end{aligned}$$

This combination of ingredients also satisfies the constraint that the preferred volume ratio of finder to glass spheres ranges from 5–10% to about 30%:

$$\begin{aligned}\text{Volume binder/volume glass spheres} &= 36.9 \text{ cc}/416 \text{ cc} \\ &= 9\%\end{aligned}$$

The formulation is made and the dielectric constant measured. A small adjustment in the formulation will correct for slight deviation from the desired dielectric constant.

The number of layers provided in a lens and their dielectric constants depends largely upon the performance requirements. It is possible, for example, to produce a relatively crude lens having a single intermediate layer. For more sophisticated applications, there is no theoretical upper limit. Practically speaking, however, 50–100 layers would provide a high performance, albeit expensive, and difficult to manufacture Luneberg lens.

For applications in which lens performance requirements are low and cost considerations are a priority, it is possible to construct a two-layer lens incorporating the teaching of the present invention. Such a two-layer lens would include an inner core of a cured or fused substantially homogenous blend of glass spheres, curable or fusible binder and, as needed to increase dielectric constant, a low-loss dielectric material. Preferably, the inner core would have a dielectric constant of from about 1.6 to about 2.0 and an interstitial void volume of from about 30% to about 50%. The two-layer lens would also include an outer shell layer comprising a cured or fused substantially homogenous blend of glass spheres and curable or fusible resin, the outer shell layer having a dielectric constant of about 1.2 to about 1.6, and an interstitial void volume of from about 30% to about 50%.

In practice, the blend selected for the inner core is used to fill the inner core mold, while vibrating the mold to ensure sufficient packing of the material. The material is then treated in such a manner as to fuse or cure the material. The curing or fusing process is dependent upon the binder selected as is well-known to those skilled in the art. The inner core mold is then removed, and the formed inner core is fixed centrally into the next larger mold of the mold set. A first intermediate layer is then formed around the inner core by filling the mold with a blend calculated to form a material having a predetermined dielectric constant and then fusing or curing the material. As with the filling of the inner core mold, this and all subsequent mold-filling steps are carried out while vibrating the mold set. This process is repeated until the final outer layer (k' about 1.0) is formed.

One of skill in the art will recognize the teaching of the present application is useful for the production of hemispherical lenses of gradient dielectric constant, as well as spherical lenses. Hemispherical lenses find application in a variety of contexts (see, e.g., U.S. Pat. No. 5,781,163).

In addition to the method of manufacture discussed above, the present invention also relates to compositions of matter. More specifically, disclosed is a lens of gradient dielectric constant having an inner core comprising a cured or fused substantially homogenous blend of glass spheres, curable or fusible binder and a low-loss dielectric material. As discussed previously, such an inner core has a dielectric constant of about 2.0. The inner core layer, as with all layers disclosed herein, has an interstitial void volume of from about 30% to about 50%.

The gradient dielectric lens of the present invention further comprises an outer shell layer having a dielectric constant of about 1.0 and comprising a cured or fused substantially homogenous blend of hollow glass spheres and curable or fusible resin.

Between the outer shell layer and the inner core are one or more intermediate layers having dielectric constants intermediate between that of the outer shell layer and that of the inner core. In preferred embodiments, two or more intermediate layers are formed.

EXEMPLIFICATION

The example described below relates to the production of an intermediate layer having a dielectric constant of 1.6. As discussed above, one can accurately select quantities of ingredients to be blended to produce a layer of the Luneberg lens having a predetermined dielectric constant through the use of the previously noted relationship between dielectric constant and actual layer density. In this example, K46 Scotchlite Glass Bubbles, Crystal Clear resin and titanium dioxide were utilized.

$$\ln k' = 1.18 \text{ (actual layer density)}$$

$$\begin{aligned}\text{actual layer density} &= \ln k'/1.18 \\ &= \ln(1.6)/1.18\end{aligned}$$

-continued $$= 0.47/1.18$$
$$= 0.40 \text{ g/cc}$$

Assuming a packing factor of 0.65:

True particle density (TPD) = actual layer density/packing factor
$$= 0.40/0.65$$
$$= 0.62 \text{ g/cc}$$

While various combinations of glass spheres, resin and titanium dioxide can satisfy the TPD of 0.62 g/cc, a mixture containing only glass spheres and resin presents a simpler manufacturing situation. Therefore, in this instance, the desired TPD was achieved using a mixture of 60 g glass spheres (density 0.46 g/cc) and 40 g resin (density 1.3 g/cc), as shown below:

TPD = sum of component weight/sum of component volume

Sum of component weight = 60 g + 40 g
$$= 100 \text{ g}$$

Sum of component volume = 60 g/0.46 g/cc + 40 g/1.3 g/cc
$$= 130.4 \text{ cc} + 30.8 \text{ cc}$$
$$= 161.2 \text{ cc}$$

TPD = 100 g/161.2 cc
$$= 0.62 \text{ g/cc}$$

This combination of ingredients also satisfies the constraint that the preferred volume ratio of resin binder to glass spheres ranges from 5–10% to about 30%, as shown:

Volume resin binder/volume glass spheres = 30.8 cc/130.4 cc
$$= 23.6\%$$

This formulation was made and tested with the following results:
  Batch Number: 901490
  Measured dielectric constant=1.54
  Target dielectric constant=1.60
  Measured actual layer density=0.38 g/cc
  Target actual layer density=0.40 g/cc
  Actual packing factor=0.613
  Target packing factor=0.65

As Batch 901490 was slightly lower than the target dielectric constant, the following slight adjustments were made. The packing factor for Batch 901490 was somewhat lower than the target value. The target true particle density was recalculated adopting a lower packing factor as shown below.

True particle density (TPD) = actual layer density/packing factor
$$= 0.40/0.62$$
$$= 0.65 \text{ g/cc}$$

This target TPD may be achieved by a mixture of 54 g K46 Glass Bubbles and 46 g Crystal Clear resin as shown below.

TPD = sum of component weight/sum of component volume

Sum of component weight = 54 g + 46 g
$$= 100 \text{ g}$$

Sum of component volume = 54 g/0.46 g/cc + 46 g/1.3 g/cc
$$= 117.4 \text{ cc} + 35.4 \text{ cc}$$
$$= 152.8 \text{ cc}$$

TPD = 100 g/152.8 cc
$$= 0.65 \text{ g/cc}$$

This formulation was made and tested with the following results:
  Batch Number: 901550
  Measured dielectric constant=1.58
  Target dielectric constant=1.60

While this batch closely approximated the target dielectric constant, this combination of ingredients approaches the upper limit of the constraint that the preferred volume ratio of resin binder to glass spheres ranges from 5–10% to about 30%, as shown:

Volume resin binder/volume glass spheres = 35.4 cc/117.4 cc
$$= 30.2\%$$

Rather than any further adjustment in the two component formulation, titanium dioxide was added to the formulation to achieve the target dielectric constant. For a target true particle density of approximately 0.65, as in the example above, the following combination of ingredients may be used: 60 g K46 Glass Bubbles, 30 g Crystal Clear resin and 10 g titanium dioxide (density 4.3)

TPD = sum of component weight/sum of component volume

Sum of component weight = 60 g + 30 g + 10 g
$$= 100 \text{ g}$$

Sum of component volume = 60 g/0.46 g/cc + 30 g/1.3 g/cc + 10 g/4.3 g/cc
$$= 130.4 \text{ cc} + 23.1 \text{ cc} + 2.3 \text{ cc}$$
$$= 155.8 \text{ cc}$$

TPD = 100 g/155.8 cc
$$= 0.64 \text{ g/cc}$$

This combination of ingredients better satisfied the constraint that the preferred volume ratio of resin binder to glass spheres ranges from 5–10% to about 30%, as shown below.

Volume resin binder/volume glass spheres = 23.1 cc/130.4 cc
= 17.7%

This formulation was made and tested with the following results:
Batch number: 901580
Measured dielectric constant=1.60
Target dielectric constant=1.60

What is claimed is:

1. A lens of gradient dielectric constant, comprising:
   a) an inner core comprising a cured or fused substantially homogenous blend of glass spheres, curable or fusible binder and as needed to increase dielectric constant, a low-loss dielectric material, the inner core having a dielectric constant of about 2.0, and an interstitial void volume of from about 30% to about 50%;
   b) an outer shell layer comprising a cured or fused substantially homogenous blend of hollow glass spheres and curable or fusible resin, the outer shell layer having a dielectric constant of about 1.0, and an interstitial void volume of from about 30% to about 50%; and
   c) two or more intermediate layers between the inner core and the outer shell layer; the intermediate layers having dielectric constants ranging from greater than 1.0 to less than 2.0 and interstitial void volumes of from about 30% to about 50%, the innermost intermediate layer having the highest dielectric constant of the intermediate layers, with each successively larger intermediate layer having a dielectric constant which is less than the adjacent smaller intermediate layer, the intermediate layers comprising a cured substantially homogenous blend of glass spheres, resin and, as needed to increase dielectric constant, a low-loss dielectric material.

2. The lens of gradient dielectric constant of claim 1 wherein the glass spheres of step a) are hollow, solid or a blend of hollow and solid.

3. The lens of gradient dielectric constant of claim 1 wherein the glass spheres of step c) are hollow, solid or a blend of hollow and solid.

4. The lens of gradient dielectric constant of claim 1 wherein the glass spheres of step a), b) and c) are less than about 200 micron particle size.

5. The lens of gradient dielectric constant of claim 1 wherein the curable binder is selected from the group consisting of polyester, epoxy, polyurethane and acrylic resins.

6. The lens of gradient dielectric constant of claim 1 wherein the fusible binder is selected from the group consisting of polyester, polyolefin, polyamide, polystyrene and styrene copolymers and thermoplastic elastomers.

7. The lens of claim 6 wherein the polyolefin is selected from the group consisting of polyethylene, polypropylene and ethylene copolymers.

8. The lens of claim 6 wherein thermoplastic elastomer is selected from the group consisting of styrene-butadiene-styrene (SBS) and styrene-isoprene-styrene (SIS) copolymers.

9. The lens of gradient dielectric constant of claim 1 wherein the low-loss dielectric material has a loss tangent (tan delta) below about 0.01, measured at microwave frequencies.

10. The lens of gradient dielectric constant of claim 1 wherein the low-loss dielectric material is selected from the group consisting of titanium dioxide, boron nitride, silicon dioxide, aluminosilicates, magnesium oxide and aluminum oxides.

11. A lens of gradient dielectric constant, comprising:
   a) an inner core comprising a cured or fused substantially homogenous blend of glass spheres, curable or fusible binder and, as needed to increase dielectric constant, a low-loss dielectric material, the inner core having a dielectric constant of about 2.0, and an interstitial void volume of from about 30% to about 50%;
   b) an outer shell layer comprising a cured or fused substantially homogenous blend of glass spheres and curable or fusible resin, the outer shell layer having a dielectric constant of about 1.0, and an interstitial void volume of from about 30% to about 50%; and
   c) an intermediate layer between the inner core and the outer shell layer; the intermediate layer having a dielectric constant between 1.3 and 1.7 and an interstitial void volume of from about 30% to about 50%, the intermediate layer comprising a cured substantially homogenous blend of glass spheres, resin and, as needed to increase dielectric constant, a low-loss dielectric material.

12. The lens of gradient dielectric constant of claim 11 wherein the glass spheres of step a) are hollow, solid or a blend of hollow and solid.

13. The lens of gradient dielectric constant of claim 11 wherein the glass spheres of step c) are hollow, solid or a blend of hollow and solid.

14. The lens of gradient dielectric constant of claim 11 wherein the glass spheres are less than about 200 micron particle size.

15. The lens of gradient dielectric constant of claim 11 wherein the curable binder is selected from the group consisting of polyester, epoxy, polyurethane and acrylic resins.

16. The lens of gradient dielectric constant of claim 11 wherein the fusible binder is selected from the group consisting of polyester, polyolefin, polyamide, polystyrene and styrene copolymers and thermoplastic elastomers.

17. The lens of claim 16 wherein the polyolefin is selected from the group consisting of polyethylene, polypropylene and ethylene copolymers.

18. The lens of claim 16 wherein thermoplastic elastomer is selected from the group consisting of styrene-butadiene-styrene (SBS) and styrene-isoprene-styrene (SIS) copolymers.

19. The lens of gradient dielectric constant of claim 11 wherein the low-loss dielectric material has a loss tangent (tan delta) below about 0.01, measured at microwave frequencies.

20. The lens of gradient dielectric constant of claim 11 wherein the low-loss dielectric material is selected from the group consisting of titanium dioxide, boron nitride, silicon dioxide, aluminosilicates, magnesium oxide and aluminum oxides.

21. A method for manufacturing a lens of gradient dielectric constant, comprising:
   a) providing a vibrating concentric mold set comprising an inner core mold, an outer shell mold, and two or more intermediate layer molds;
   b) providing a substantially homogenous dry blend of glass spheres, curable or fusible binder and, as needed to increase dielectric constant, a low-loss dielectric material, and filling the inner core mold with the substantially homogenous dry blend of this step while vibrating the inner core mold c) curing or fusing the curable or fusible binder, the inner core being formed in this step having a dielectric constant of about 2.0, and an interstitial void volume of from about 30% to about 50%;

d) positioning the core formed in step a) centrally within the innermost intermediate layer mold;

e) providing a substantially homogenous dry blend of glass spheres, resin and, as needed to increase dielectric constant, a low-loss dielectric material, and filling the vacant portion of the innermost intermediate layer mold with the substantially homogenous dry blend of this step while vibrating f) curing or fusing the curable or fusible binder; the innermost intermediate layer being formed in this step having a dielectric constant less than 2.0, but greater than the dielectric constant of outermore layers described below, and an interstitial void volume of from about 30% to about 50%;

g) positioning the product of step f) centrally within the next larger intermediate layer mold;

h) providing a substantially homogenous dry blend of glass spheres, resin and, as needed to increase dielectric constant, a low-loss dielectric material, and filling the vacant portion of the next larger intermediate layer mold with the substantially homogenous dry blend of this step while vibrating;

i) curing or fusing the curable or fusible binder; the intermediate layer being formed in this step having a dielectric constant less than the dielectric constant of the layer formed in step f), but greater than the dielectric constant of outermore layers described below, and an interstitial void volume of from about 30% to about 50%;

j) optionally repeating the mold placement and filling steps described above to form successively larger concentric intermediate layers;

k) positioning the product formed using the largest intermediate layer mold centrally within the outer shell mold;

l) providing a substantially homogenous dry blend of glass spheres and a curable or fusible binder and filling the vacant portion of the outer shell mold with the substantially homogenous dry blend of this step while vibrating; and m) curing or fusing the curable or fusible binder; the outer shell layer being formed in this step having a dielectric constant of about 1.0, and an interstitial void volume of from about 30% to about 50%.

22. The method claim 21 wherein the glass spheres of step b) are hollow, solid or a blend of hollow and solid.

23. The method claim 21 wherein the glass spheres of step e) and h) are hollow, solid or a blend of hollow and solid.

24. The method claim 21 wherein the glass spheres are less than about 200 micron particle size.

25. The method claim 21 wherein the curable binder is selected from the group consisting of polyester, epoxy, polyurethane and acrylic resins.

26. The method claim 21 wherein the fusible binder is selected from the group consisting of polyester, polyolefin, polyamide, polystyrene and styrene copolymers and thermoplastic elastomers.

27. The method of claim 26 wherein the polyolefin is selected from the group consisting of polyethylene, polypropylene and ethylene copolymers.

28. The method of claim 26 wherein thermoplastic elastomer is selected from the group consisting of styrene-butadiene-styrene (SBS) and styrene-isoprene-styrene (SIS) copolymers.

29. The method claim 21 wherein the low-loss dielectric material has a loss tangent (tan delta) below about 0.01, measured at microwave frequencies.

30. The method claim 21 wherein the low-loss dielectric material is selected from the group consisting of titanium dioxide, boron nitride, silicon dioxide, aluminosilicates, magnesium oxide and aluminum oxides.

31. A method for manufacturing a lens of gradient dielectric constant, comprising:

a) providing a vibrating concentric mold set comprising an inner core mold, an outer shell mold, and an intermediate layer mold;

b) providing a substantially homogenous dry blend of glass spheres, curable or fusible binder and, as needed to increase dielectric constant, a low-loss dielectric material, and filling the inner core mold with the substantially homogenous dry blend of this step while vibrating the inner core mold c) curing or fusing the curable or fusible binder, the inner core being formed in this step having a dielectric constant of about 2–0, and an interstitial void volume of from about 30% to about 50%;

d) positioning the core formed in step a) centrally within the intermediate layer mold;

e) providing a substantially homogenous dry blend of glass spheres, resin and, as needed to increase dielectric constant, a low-loss dielectric material, and filling the vacant portion of the intermediate layer mold with the substantially homogenous dry blend of this step while vibrating;

f) curing or fusing the curable or fusible binder; the intermediate layer being formed in this step having a dielectric constant less than 2.0, but greater than 1.0, and an interstitial void volume of from about 30% to about 50%;

g) positioning the product of step f) centrally within the outer shell mold;

h) providing a substantially homogenous dry blend of glass spheres and a curable or fusible binder and filling the vacant portion of the outer shell mold with the substantially homogenous dry blend of this step while vibrating; and i) curing or fusing the curable or fusible binder;

the outer shell layer being formed in this step having a dielectric constant of about 1.0, and an interstitial void volume of from about 30% to about 50%.

32. The method claim 31 wherein the glass spheres of step b) are hollow, solid or a blend of hollow and solid.

33. The method claim 31 wherein the glass spheres of step e) are hollow, solid or a blend of hollow and solid.

34. The method claim 31 wherein the glass spheres are less than about 200 micron particle size.

35. The method claim 31 wherein the curable binder is selected from the group consisting of polyester, epoxy, polyurethane and acrylic resins.

36. The method claim 31 wherein the fusible binder is selected from the group consisting of polyester, polyolefin, polyamide, polystyrene and styrene copolymers and thermoplastic elastomers.

37. The method of claim 36 wherein the polyolefin is selected from the group consisting of polyethylene, polypropylene and ethylene copolymers.

38. The method of claim 36 wherein thermoplastic elastomer is selected from the group consisting of styrene-butadiene-styrene (SBS) and styrene-isoprene-styrene (SIS) copolymers.

39. The method claim 31 wherein the low-loss dielectric material has a loss tangent (tan delta) below about 0.01, measured at microwave frequencies.

40. The method claim 31 wherein the low-loss dielectric material is selected from the group consisting of titanium dioxide, boron nitride, silicon dioxide, aluminosilicates, magnesium oxide and aluminum oxides.

41. A lens of gradient dielectric constant, comprising:

a) an inner core comprising a cured or fused substantially homogenous blend of glass spheres, curable or fusible binder and, as needed to increase dielectric constant, a low-loss dielectric material, the inner core having a dielectric constant of from about 1.6 to about 2.0, and an interstitial void volume of from about 30% to about 50%; and b) an outer shell layer comprising a cured or fused substantially homogenous blend of glass spheres and curable or fusible resin, the outer shell layer having a dielectric constant of about 1.2 to about 1.6, and an interstitial void volume of from about 30% to about 50%.

* * * * *

UNITED STATES PATENT AND TRADEMARK OFFICE
CERTIFICATE OF CORRECTION

PATENT NO.     : 6,433,936 B1
DATED          : August 13, 2002
INVENTOR(S)    : Carpenter et al.

It is certified that error appears in the above-identified patent and that said Letters Patent is hereby corrected as shown below:

Column 11,
Lines 52, 54, 56, 58 and 61, after "method" insert -- of --.

Column 12,
Lines 5, 8, 52, 54, 56, 58 and 61, after "method" insert -- of --.
Line 25, delete "2-0" and substitute therefore -- 2.0 --.

Column 13,
Lines 5 and 8, after "method" insert -- of --.

Signed and Sealed this

Tenth Day of December, 2002

JAMES E. ROGAN
*Director of the United States Patent and Trademark Office*